US005415268A

United States Patent [19]

Löfgren

[11] Patent Number: 5,415,268

[45] Date of Patent: May 16, 1995

[54] METHOD FOR PRE-DETERMINABLE ORIENTATION OF LABEL AND CAPSULE RELATIVE TO EACH OTHER ON A BOTTLE DURING THE BOTTLING PROCEDURE AND APPARATUS THEREFOR

[75] Inventor: Sven Löfgren, Kungsängen, Sweden

[73] Assignee: AB Pripps Bryggerier, Sweden

[21] Appl. No.: 71,191

[22] Filed: Jun. 2, 1993

[30] Foreign Application Priority Data

Jun. 3, 1992 [EP] European Pat. Off. ........... 92850124

[51] Int. Cl.[6] ............................................ B65G 47/24

[52] U.S. Cl. .................................... 198/394; 198/384

[58] Field of Search ............... 198/385, 394, 379, 384, 198/386, 387; 101/38.1, 39, 40; 156/566–568, DIG. 26, DIG. 27

[56] References Cited

U.S. PATENT DOCUMENTS 2,528,860 11/1950 Clark .................................. 198/394
4,164,281 8/1979 Schnier .............................. 198/394
4,227,619 10/1980 Magnusson ........................ 215/255
4,768,667 9/1988 Magnusson ........................ 215/255
5,004,517 4/1991 Orlandi ............................. 156/567
5,058,724 10/1991 Hinton .............................. 198/394
5,137,136 8/1992 Humele ............................. 198/394
5,201,984 4/1993 Bedin ................................ 198/394

FOREIGN PATENT DOCUMENTS 476251 7/1991 European Pat. Off. .

*Primary Examiner*—Joseph E. Valenza
*Attorney, Agent, or Firm*—Ostrolenk, Faber, Gerb & Soffen

[57] ABSTRACT

Method and apparatus for a pre-determinable orientation of label and capsule relatively to each other on a bottle during the bottling procedure, whereby the bottles are arranged to pass a positioning or orientation station, in which each individual bottle by mechanical or optical detection of at least one discontinuity or stationary marking on the bottle, on the sealing or on the label of the bottle is orientated in a predetermined position and releasably retained in this position during the following sealing or labelling of the bottle.

18 Claims, 3 Drawing Sheets

25
36
26
27
28
35
2
33
32a
32
28a

E
33
2
35
D
25
B
26
E
33a

METHOD FOR PRE-DETERMINABLE ORIENTATION OF LABEL AND CAPSULE RELATIVE TO EACH OTHER ON A BOTTLE DURING THE BOTTLING PROCEDURE AND APPARATUS THEREFOR

BACKGROUND OF THE INVENTION

Field of the Invention

The present invention relates to a method for a pre-determinable orientation of label and capsule of a bottle relative to each other during the filling procedure and apparatus therefor.

The invention can be used for all types of known capsules of metal or polymers, such as, for example, screw capsules, capsules provided with tabs protruding from the mantle portion of the capsule and adapted to be gripped by fingers for facilitating the opening of the closure, means for tearing off capsules adapted to be torn-off, or similar.

In a wider sense the present application can also be used for containers, i.e. conventional packages for pharmaceutical preparation etc.

The invention can also be used for bottles with labelling like stamped emblems or label-like impressions or pre-printed labels such as often are found on recoverable bottles.

The predeterminable positional coordination of label and capsule according to the invention provides many advantages, of which should be mentioned in the first place the possibility to fix in position a certain marking or logo arranged on the upper part of the capsule relative to the labelling and, furthermore, the possibility to fix in position gripping tabs, holds for fingers or tearing-off means of the capsule relative to the labelling. The aforementioned parts protruding from the capsule may be coloured, for example, in the main colour of the label, whereby an excellent aesthetic effect is achieved. Nowadays most types of capsules are provided with safety devices to impede manipulation of the contents, for example capsules to be torn-off. The large number of existing technical solutions makes it desirable to give directions for how to open the capsule in order to provide for problemless opening. In regard to e.g., tear-off capsules entirely new means for safeguarding easy opening are thus obtained.

In the following the invention will be described in more detail in connection with the use of closures consisting of tear-off capsules without, however, thereby being limited to this application.

BRIEF DESCRIPTION OF RELATED ART

Such tear-off capsules are, for example, described in U.S. Pat. No. 4,227,619 and are provided with a tear-off member connected to a flap protruding from the skirt of the capsule. The side edges of said flap are continuing in score lines extending over the skirt and the upper part of the capsule. On pulling the tear-off member the capsule is broken along these score lines. In certain cases such capsules are arranged so that they, after having been partially torn open, already can be removed from the neck of the bottle. Often such partial opened capsules may be used for a temporary dust-free reclosure of the bottle.

In earlier used capsules the pulling tear-off member was just consisting of an extension of the protruding flat, i.e. of an elongated strip of metal. In order to avoid cut wounds originating from the cutting action of the tear-off strip when the capsule is opened, a great variety of score line designs were tried to achieve an opening as easy and safe as possible. The most widely used tear-off capsule of this kind is opened by pulling the tear-off member straight away from the bottle mouth by gripping said member between the thumb and the forefinger.

In tear-off capsules developed more recently, such as those described in U.S. Pat. No. 4,768,667, the earlier strip-formed metallic pulling member has been replaced by a plastic ring eliminating any risk for cuts, which, when used properly, also provides for a certain venting effect and thereby provides for an easier and safer opening of the capsule.

Extensive instructions for opening such capsules obviously cannot be printed on the upper part of the capsule, due to the fact that said part of the capsule often is coloured and the limited space is needed for the identification of the product or the manufacturer and often also is used for a logo.

It would be more natural if such opening instructions could be given on the label. For such instructions being sufficiently conspicuous at the right moment, the tear-off member and the label have to be positioned relative to each other in a way that the consumer, when opening the capsule, automatically faces the instructions given on the label.

SUMMARY OF THE INVENTION

It has been found that, by means of the present invention, the intended coordination between label and pulling member can be realized and that, thereby, for the first time a tear-off instruction can be given that is conspicuous to the person opening the closure at the very moment of opening, and which thus provides for a safer and easier opening procedure.

According to the present method in that the bottles are arranged to pass a positioning station, in which each individual bottle by mechanical or optical detection of at least one discontinuity or stationary marking on the bottle, on the sealing or on the label of the bottle is orientated in a predetermined position and retained in this position during the following sealing or labelling of the bottle.

Preferably each capsuled bottle is moved to said positioning station and under a rotary movement arranged to pass a stationary sensor for detecting a discontinuity or marking on the capsule after which the rotation of the bottle is made to cease immediately and the bottle in this fixed position is passing a labelling station for labelling or, in case the bottle being provided with labels printed on or stamped into the bottle, a capsulation station, In using bottles having stamped emblems, label-like impressions or pre-printed labels, the fixation in a predetermined position described above is carried out prior to feeding the bottles through the sealing or capsulation station, whereby the positioning of the capsule is coordinated with the label-like impression or similar described above.

According to a preferred embodiment of the proposed method each bottle in a row of bottles arriving on a conveyor belt from the capsulation station is fed into a recess arranged on a star wheel, said recess being adapted to receive one bottle at a time and to cooperate with the conveyor belt, and that a rotation of the bottle in said recess is achieved by bringing the bottle to abut rotationally mounted guide rollers arranged on either side of the recess, abutment being effected by at least one guide list arranged at some distance from and along the periphery of the star wheel, and that the rotation of the bottle in said recess is made to cease as soon as the predetermined positioning of the bottle has been attained.

It is also possible to use an optical sensor as a stationary sensing means, suitably provided with fiber optics, which, for maintaining the bottle in its final position activates a mechanical braking and locking means.

It is preferred to use a mechanically operated locking means as stationary sensor means, which is brought into abutting contact with an element protruding from the capsule for effecting positional fixation of the bottle.

According to another advantageous aspect, the invention can be used for positional orientation of screw capsules provided with suitable readable markings on their skirt or top section or for positional orientation of capsules having flags or the like protruding from the capsule skirt; for positional fixation of the bottle these flaps are brought into abutting contact with stationary locking means during the residence of the bottle in the recess of the star wheel.

The positional fixation of a bottle can be effected through detecting or reading of stamped markings, for example label-like imprints or pre-printed labels, present on the bottle.

A preferred method for arranging label and capsule in a pre-determined position relative to each other when sealing bottles with tear-off capsules having a pulling member protruding from the capsule skirt comprises the following steps.

after the capsulating stage each bottle is fed into a recess in a star wheel acting as a means for positional fixation or orientation of the bottle, the bottle is arrange to rotate in the recess until the pulling member protruding from the capsule skirt is brought into abutting contact with a stationary locking means arranged at the star wheel and cooperating with the recess, and the bottle in said positionally fixed orientation the bottle is arranged to pass a labelling station.

The present invention also comprises an apparatus for a predeterminable orientation of label and capsule relative to each other on a bottle during the bottling procedure comprising the following features:

a star wheel with a number of recesses arranged along its periphery at intervals of equal length, said recesses being adapted to receive the neck portion of the bottle, and central and lower recesses adapted to receive the mid-portion and bottom position, respectively, of the bottle, a pair of guide rollers, each mounted in bearings arranged on either side of the recess, at least one guide rail arranged at a distance from the star wheel along its periphery, said guide rail being arranged to force each bottle into abutting contact with the respective guide rollers, thereby imparting a rotational movement to the bottle while being resident in said recesses, stationary sensor and/or brake means provided for each recess and firmly attached to the star wheel and arranged to hold, either by themselves or in mutual cooperation, the respective bottle in a predetermined position by a discontinuity or mark on the capsule or the bottle detectable from outside, during the passage of the bottle through a sealing or labelling station.

According to a suitable embodiment of the invention said apparatus comprises a locking or braking means for positional orientation of bottles sealed with capsules having a part extending exteriorly from the capsule shirt said locking or breaking means having a base plate being movable and resiliently mounted on said star wheel and carrying a locking arm extending towards said recess, said locking arm being restricted in its lateral movement and being resiliently arranged and having a frontal free end arranged for abutting contact with the capsule for positional fixation of the bottle.

It is preferred that the sensing means is directed towards the capsule skirt or top section if the capsule and is arranged for detection of a marking on the skirt or top section of the capsule, said marking being selected as positional reference for the positional orientation of the bottle when locking it in place, the sensor means being arranged, by cooperation with suitable locking means, for locking the bottle in a positional orientation predetermined in respect to the positional reference selected by the sensing means.

Suitable one stationary optical sensor is arranged for each recess of the star wheel, the sensor being directed towards the capsule skirt or top section and being arranged for cooperation with a marking on the skirt or top section of the capsule and, for closing the bottle, by cooperation with suitable locking means, in the position indicated by the sensor. Such a locking means may be brought into abutting contact with the top portion of the capsule.

For positional fixation of the bottle prior to capsulation, said stationary sensing means is arranged for cooperation with at least one discontinuity of the bottle detectable from outside, for example, labels or imprints and markings on the bottle. Suitably fiber optics are used with optical sensors.

Depending on the size and shape of the bottle, the central and lower recesses of the star wheel may be substituted by a single lower recess.

In the following the invention will be described in detail with reference to the attached drawings illustrating various embodiments of the invention:

DETAILED DESCRIPTION OF PREFERRED EMBODIMENTS OF THE INVENTION

Figure 1:
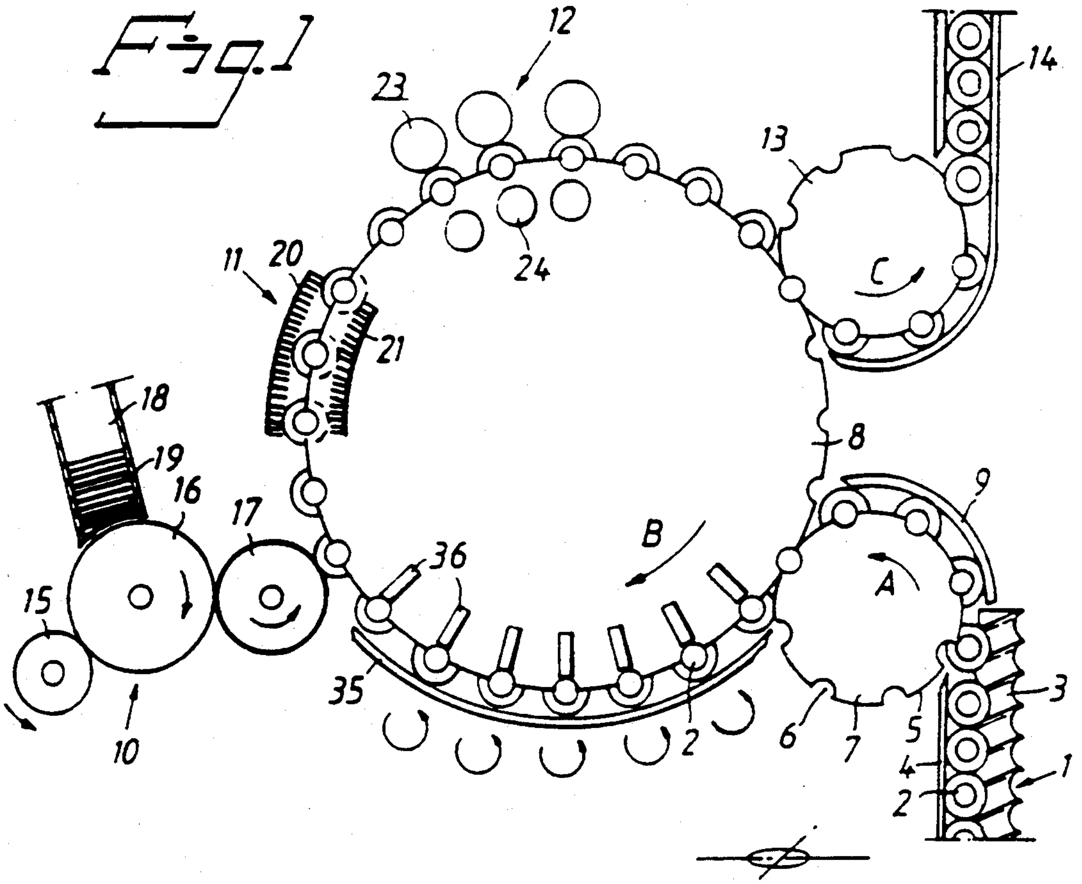
FIG. 1 is a schematic top view of an apparatus according to the invention cooperating with a labelling station.

FIG. 1 illustrates the principle construction of an apparatus proposed according to the invention cooperating with standard-type sealing and labelling stations. A row of capsulated bottles 2 arrive in an outfeed trench 1 from a capsulation station not shown.

By an infeed screw 3 arranged on one side of said outfeed trench 1 and a guide rail 4 arranged on is other side and opposite to the screw 3, the arriving bottles 2 are fed to semicircular recesses 6 arranged along the periphery of an infeed wheel 7 rotating in the direction of arrow A and, further, from the infeed wheel 7 to corresponding recesses 27, 28, 28*a* (shown in FIG. 3) along the periphery of a star wheel 8 rotating in the direction of arrow B. The star wheel 8 constitutes the central component of the apparatus proposed according to the invention. Along a part of its periphery, the infeed wheel 7 cooperates with a guide rail 9 arranged at a distance from the periphery of the infeed wheel 7 and extending from the infeed trench 1 to the spot where the bottles 2 are fed into the recesses 27, 28 28*a* at the star wheel 8.

During their transport by the star wheel 8 the bottles become positionally fixed in the way described below and thus positionally fixed are arranged to pass a labelling station 10, a station 11 for smoothing out the labels and, lastly, a station 12 for final fixation of the labels, whereafter, via an outfeed wheel 13 cooperating with the star wheel 8 and rotating in the direction indicated by arrow C and of a design essentially similar to that of infeed wheel 7, the labelled bottles 2 are delivered to an outfeed trench 14.

The labelling station 10 consists suitable of a traditional arrangement of rollers 15, 16, 17 by which the individual labels are fetched from a supply pipe 19, and one-by-one are transferred to a positionally fixed passing bottle 2. The smoothing-out station 11 may suitably consist of traditional brush arrangements 20, 21, and the station 12 of suitable pressure rollers 23, 24.

Figure 2:
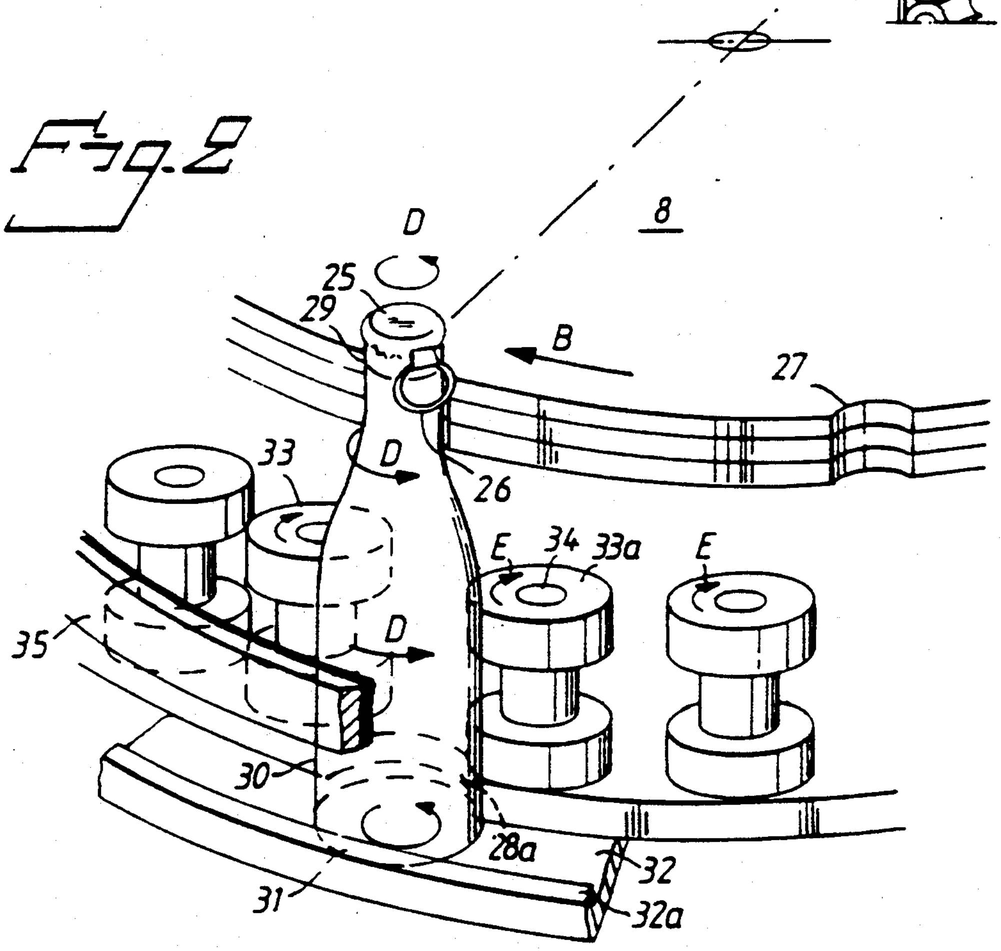
FIG. 2 is a side view in perspective of the orientation station shown in FIG. 1.
Figure 3:
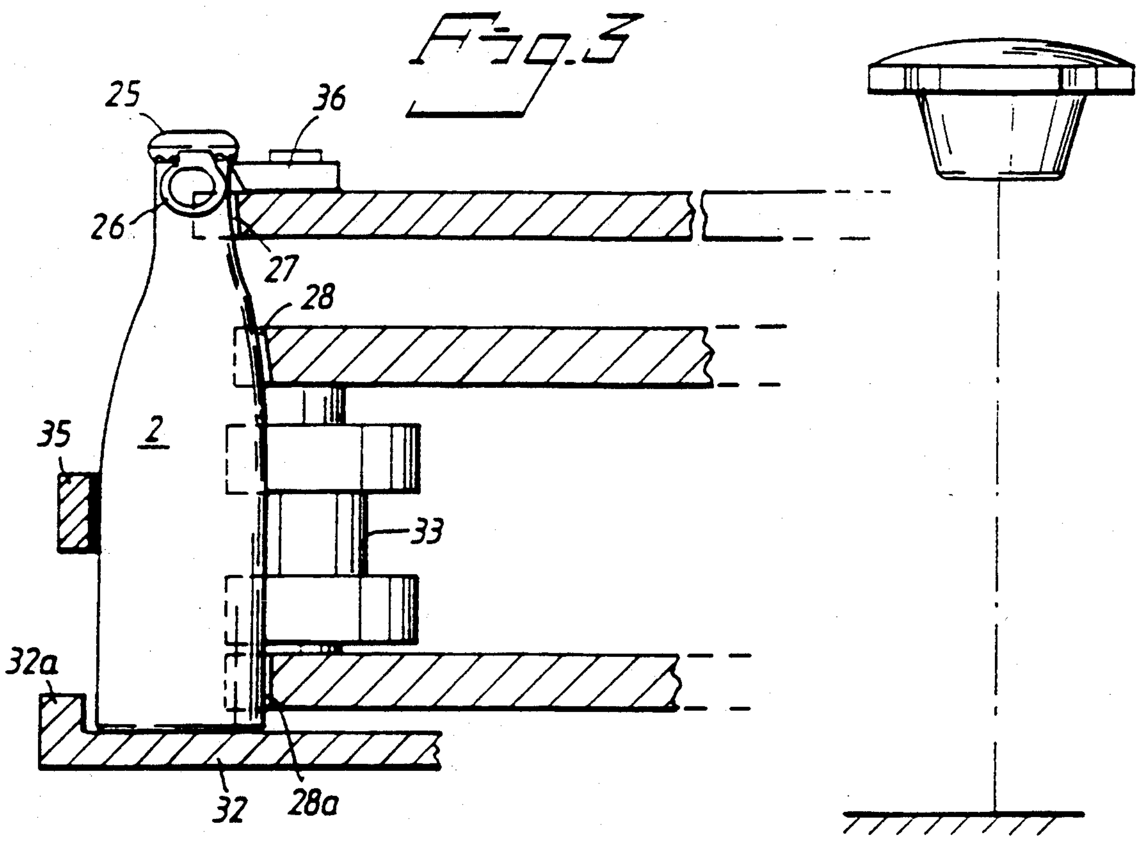
FIG. 3 is a sectional view, in part in perspective, of the orientation station shown in FIG. 1.
Figure 4:
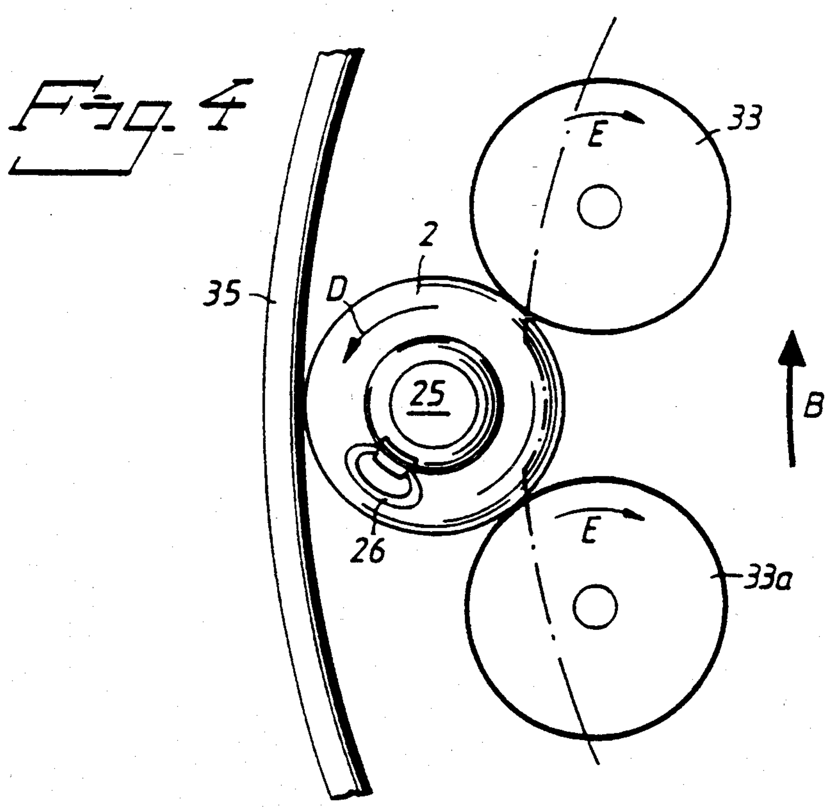
FIG. 4 is a schematic top view of a bottle maintained in the predetermined position according to FIG. 3.

FIGS. 2, 3, and 4 illustrate in more detail how the positional orientation and fixation of the bottles 2 is achieved prior to labelling.

The specific embodiment of the apparatus shown in these Figures is particularly suitable for bottle closures of the tear-off capsule type, that is, metal capsules with tear-off members extending from the capsule skirt. In the embodiment shown in FIGS. 2–4 the bottles 2 have been sealed with metal capsules according to U.S. Pat. No. 4,768,667 in which a pulling ring 26 made of plastic is fixed at a flap extending from the capsule skirt, which pulling ring 26 and flap cooperate with score lines (now shown) provided on the capsule and, via the capsule skirt, extending to the flat top portion of the capsule.

Along the periphery and arranged in equally spaced intervals, the star wheel 8 has a number of upper semicircular recesses 27 as well as a number of pairs of central and lower recesses 28, 28*a* of somewhat larger diameter than that of the upper recesses 27. Each set of recesses 27, 28; 28*a* are centered around a common axis and arranged for partial abutment with the neck portion 29, the central portion and the bottom portion of the bottle 2, respectively. The bottom 31 of the bottle 2 rests on a flat flange 32 peripherally extending from the star wheel 8, which flange 32 suitably may be provided at its periphery with a supporting rim 32*a* extending upwards from the flange 32. One each of a pair of guide rollers 33, 33*a* are arranged on either side of the lower recess 28, 28*a*. The guide rollers 33, 33*a* are suitably of bobbin-like form and with their rotational axes equidistantly arranged in respect of the axis of the bottle 2 resident in the recesses 27, 28, 28*a*, to make them abut the bottle 2 with their respective end flanges.

At some distance from the star wheel 8 and along its periphery an outer peripheral a guide rail 35 is arranged. But also several, preferably two, of such guide rails can be arranged at some distance from each other, said distance being determined by the length or width of the labels. The distance between the guide rail 35 and the star wheel 8 is dimensioned in a way that a bottle 2 placed in-between them is brought into abutting contact with guide rollers 33, 33*a* to automatically impart to the bottle 2 a rotational, counter-clockwise movement during its transport by the star wheel 8—see arrows D—while the guide rollers 33, 33*a* are made to rotate in the opposite direction, cf. arrows E. The bottle is rotated until the pulling ring 26 extending from the capsule shirt is brought to abut against a locking means 36 extending with its front edge into the narrow space between the pulling ring 26 and the neck of the bottle 2, thereby stopping the rotation of the bottle 2 to effect the intended positional fixation prior to the bottle 2 arriving at the labelling station 10.

Figure 5:
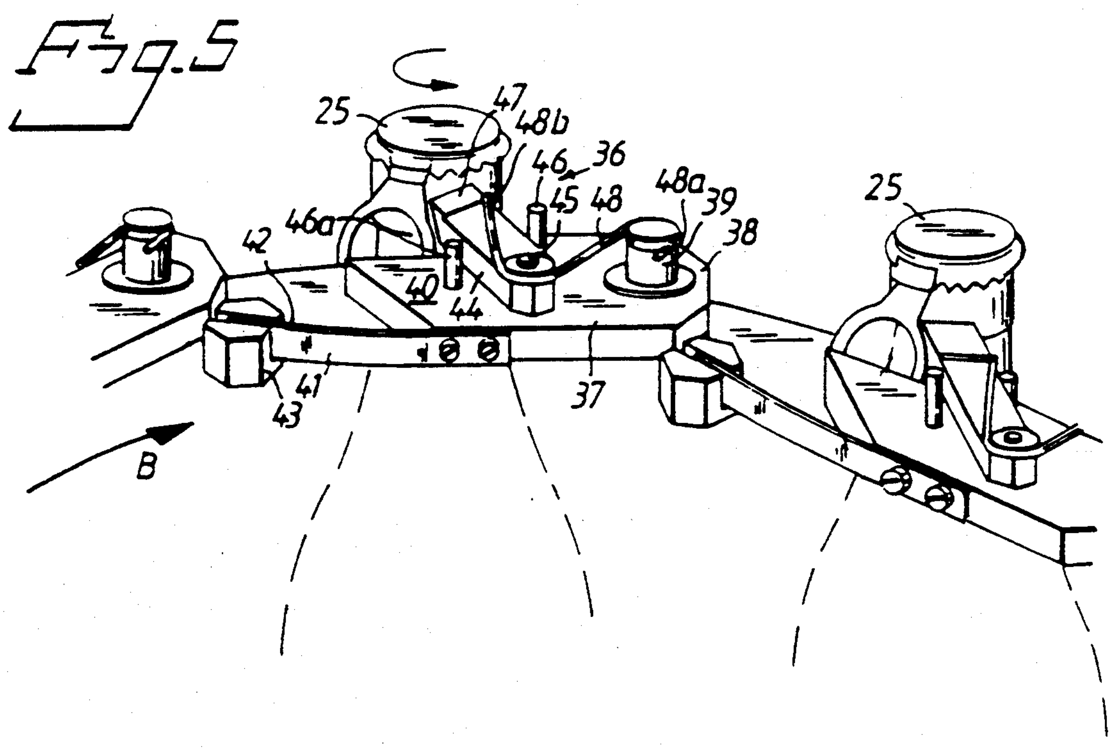
FIG. 5 is a schematic view of a locking means used for the positional of the bottle in a recess of the star wheel and FIG. 6 is a schematic view of an alternative apparatus according to the invention for a pre-determinable orientation of a bottle and means for maintaining the bottle in said position.

As evident from FIG. 5, the locking means 36 of each upper recess 27 consists of a base plate 37 arranged on the upper portion of the star wheel 8, one end portion 38 of the base plate 37 arranged for rotational movement around a tap 39 and the other, opposite end portion 40 cooperating with a leaf spring 41 fixed thereto, which, with its free end 42, is mounted in a retainer 43 fixed to the star wheel 8.

Arranged on the base plate 40 is a locking arm 44 mounted for restricted movement and extending in the direction of the recess 27. The rear end of the locking arm 44 is movable around a tap 45. The lateral movement of the locking arm 44 is limited by stop pins 46, 46*a* arranged on either side of it and extending upwards from the base plate 40 to which they are fixed. The front portion of the locking arm 44 adapted for cooperation with the capsule 25 is designed as a locking shoulder 47, a part of which rises over the upper border of the recess 27. The entire locking arm 44 is spring-loaded by means of a spring 48 of which the rear end portion 48*a* is retained by the tap 39, and which cooperates, with its other end portion 48*b*, with the rear side of the locking shoulder 47. A gentle braking action and positional fixation of the bottle 2 is achieved in the way described above.

The apparatus described above and shown in FIGS. 2–5 can, of course, be used for other capsules than the tear-off capsules according to U.S. Pat. No. 4,768,667, such other capsules comprising capsules made entirely of plastic material having gripping means extending from the skirt as well as capsules provided with any sort of external shoulder facilitating their opening.

The principle disclosed by the invention can, however, also be used for capsules of an entirely different type, for example, capsules to be screwed on the bottle. A suitable apparatus for positional fixation of bottles provided with such capsules is shown in FIG. 6.

Figure 6:
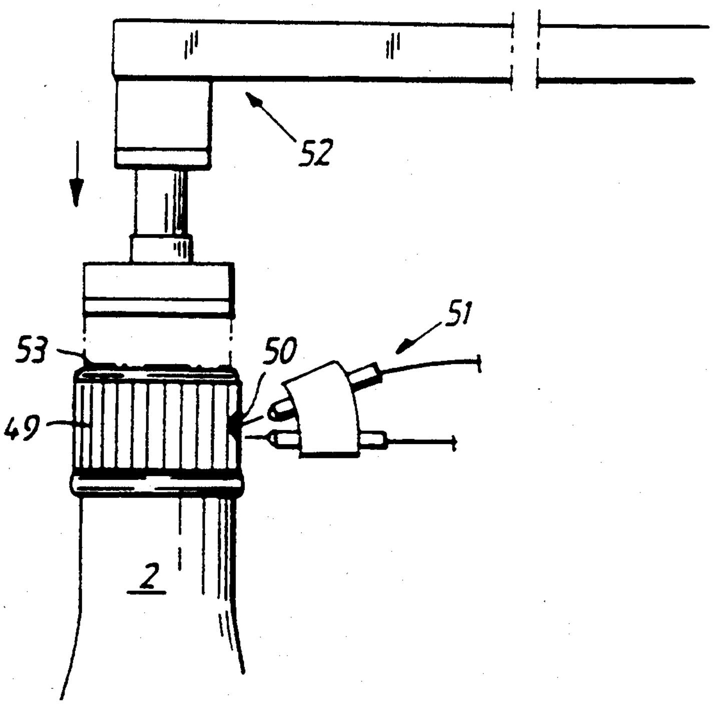

The bottle 2 shown in FIG. 6 has been sealed by a traditional screw capsule provided on its external skirt surface with a marking 50 that is darker than the rest of the skirt. The positional fixation of the bottle 2 rotating in the recess 27 of star wheel 8 is controlled by means of an optical sensor means 51 fixed in place and arranged at the level of the capsule skirts of passing bottles, detecting changes in light reflectance such as the decrease in reflectance when the bar moves into the optical field of the sensor 51 provided with fiber optics. Suitable, the sensor means 51 is arranged to be in a sensing state only when a passing capsule 49 moves into its optical field, and only as long as the capsule 49 remains in the field.

During the active sensing period for a capsule 49 of an individual bottle 2, the sensor means 51 will detect a decrease in the intensity of reflected light when the darker marking moves into the optical field. This change in reflectance is translated to a change in electrical signal in the sensor means 51, which signal is amplified and used to activate the electrically operated locking means 52 provided with an electromagnet, to make them abut against the essentially flat top portion of the capsule 49, thereby locking the bottle 2 in the position selected by the sensor means 51.

Instead of the sensor means with fiber optics described above, any other optical or meachanical sensor means can be used. The marking need not be placed on the skirt of the capsule but can be arranged in any suitable place. The locking means can be designed in a variety of ways but should preferably comprise an element having a surface with suitable frictional properties to be brought into contact with the top portion of the capsule. The locking means can also be designed for blocking the rotation of the bottle by abutting frictional contact against the neck portion or the mantle portion of the bottle. The locking means can also be driven by an electrical motor or by compressed air.

According to a further embodiment not shown in the drawings, the principle of the invention can also be applied to bottles or other essentially rotationally symmetric containers having labels, logos, imprints, preprints, marks, stamps or any sort of such or other markings on the outer surface of the container or being detectable from outside. In such case these markings can be used for positional orientation and fixation of the bottle or rotationally symmetric container in such way that the capsule is put on in a predetermined position in relation to the position of the marking on the bottle or container.

I claim:

1. A method for predeterminably orienting relative to a stationary labelling station a substantially rotationally symmetric bottle optionally provided with a capsule closure, said bottle passing from an entry point to said stationary labelling station along a predetermined path thereof, said bottle when passing the labelling station being provided with a label dispensed from said station, the method comprising the steps of:

feeding in an upright position each bottle of a plurality of bottles into a corresponding peripheral recess on a rotating star wheel, said recess being provided with a pair of passively rotating guide rollers disposed at its periphery, imparting a rotational movement to said bottle by making the bottle abut said guide rollers and a stationary guide rail disposed at a distance from and extending along the periphery of the star wheel, detecting a rotationally unsymmetric discontinuity or marking on at least one of the bottle and the capsule, and simultaneously to the detection, without further rotation of the bottle, applying locking means to make the rotation of the bottle cease such that said discontinuity or marking is in a predetermined orientation in respect of the labelling station while maintaining said abutment of said bottle with said guide rollers and said stationary guide rail, wherein said locking means comprises a base plate pivotably mounted on the star wheel and biased by spring means toward the recess, the base plate carrying a locking arm extending towards the recess, said locking arm being spring loaded and structured and arranged for lateral movement with respect to said base plate, said locking arm having a frontal end for locking contact with the capsule.

2. The method of claim 1, wherein the locking means comprises the detection means.

3. The method of claim 2, further comprising the step of bringing the locking means into abutting contact with an element protruding from the capsule to make the rotation of the bottle cease.

4. The method of claim 3, wherein the element protruding from the capsule is a flap or a pulling member.

5. The method of claim 2, wherein the locking means is brought into abutting contact with a rotationally unsymmetrical three-dimensional discontinuity on the outside of the bottle to make the rotation of the bottle cease.

6. An apparatus for predeterminably orienting relative to a stationary labelling station a bottle optionally provided with a capsule closure, said bottle passing from an entry point to said stationary labelling station along a predetermined path thereof, said bottle when passing the labelling station being provided with a label dispensed from said station, said apparatus comprising:

a star wheel having a number of equidistantly spaced recesses at its horizontal periphery, said recesses being adapted to receive said bottle, a pair of passively rotatable guide rollers disposed at the periphery of each recess and a stationary guide rail disposed at a distance from and extending along the periphery of the star wheel in a position abutable with the bottle, for providing the bottle with a rotational movement, the stationary guide rail being structured and arranged to abut with the bottle during substantially all of said passage from the entry point to the labelling station, one sensor means for each recess attached to the star wheel at about the level for detecting a discontinuity or mark on at least one of the bottle and the capsule, and locking means peripherally attached to the star wheel for arresting the bottle in a predetermined position simultaneously to the detection, without further rotation of the bottle, the locking means comprising a base plate pivotably mounted on the star wheel and biased by spring means toward the recess, the base plate carrying a locking arm extending towards the recess, said locking arm being spring loaded and structured and arranged for lateral movement with respect to the base plate, the locking arm having a frontal end for locking contact with the capsule.

7. The apparatus of claim 6, wherein the locking means is comprised by the sensor means.

8. The apparatus of claim 6, wherein the sensor means is arranged at about the level of the capsule.

9. The apparatus of claim 6, wherein each recess comprises a set of vertically disposed recesses adapted to receive various portions of the bottle.

10. The apparatus of claim 6, wherein the star wheel comprises a radially extending flange for receiving the bottom of the bottle, said flange comprising a peripheral rim.

11. The apparatus of claim 6, wherein said locking contact is with a portion of the capsule extending in a radial direction.

12. An apparatus for predeterminably orienting a container during passage along a predetermined path, said apparatus comprising:

a powered orbiting conveyor for conveying the container along the predetermined path, the conveyor including recess means for retaining the container during the passage, positioning means for positioning the container to a predetermined position in the recess means, the positioning means including support means for abutting with the container during substantially all of the passage, and locking means attached to the conveyor for locking the container in the predetermined position, wherein the locking means includes plate means pivotably mounted on the conveyor and biased by spring means toward the recess means, and resilient means structured and arranged for lateral movement relative to the plate means and for locking contact with the container, the resilient means being spring loaded.

13. The apparatus of claim 12, further comprising stop means for limiting the lateral movement of the resilient means.

14. The apparatus of claim 13, wherein:

the conveyor comprises a star wheel having a number of equidistantly spaced recesses at its horizontal periphery, said recesses being adapted to receive said container;

the support means comprises a stationary guide rail disposed at a distance from and extending along the periphery of the star wheel in a position abutable with the container;

the plate means comprises a base plate arranged on an upper portion of the star wheel, a first end portion of the base plate being structured and arranged for rotational movement around a first pivot element, and a second, opposite end portion of the base plate cooperating with a leaf spring, a first end of the leaf spring being connected to the base plate and a second end of the leaf spring being mounted in a retainer fixed to the star wheel;

the resilient means comprises a locking arm extending in the direction of the recess, a rear end of the locking arm being movable around a second pivot element; and the stop means comprises a pair of stop pins arranged on either side of the locking arm and extending upwards from the base plate to which the stop pins are fixed.

15. The apparatus of claim 14, wherein a front portion of the locking arm has a locking shoulder, a part of the locking shoulder rising above an upper border of the recess.

16. The apparatus of claim 15, wherein the locking means being retained by the first pivot element, and a second end of the spring means cooperating with a rear side of the locking shoulder.

17. The apparatus of claim 14, wherein the positioning means further comprises a pair of passively rotatable guide rollers disposed at the periphery of each recess, the pair of passively rotatable guide rollers in combination with the stationary guide rail providing the container with a rotational movement.

18. The apparatus of claim 6, further comprising means for limiting the lateral movement of the locking arm.

* * * * *